(12) United States Patent
Lan et al.

(10) Patent No.: US 9,946,301 B2
(45) Date of Patent: Apr. 17, 2018

(54) PIVOT STRUCTURE AND ELECTRONIC DEVICE HAVING THE SAME

(71) Applicants: Wei-Hao Lan, Taipei (TW); Jyh-Chyang Tzou, Taipei (TW); Ching-Tai Chang, Taipei (TW); Chia-Chi Lin, Taipei (TW); Tsai-Yu Lin, Taipei (TW); Hsin Yeh, Taipei (TW); Che-Hsien Lin, Taipei (TW); Cheng-Shiue Jan, Taipei (TW)

(72) Inventors: Wei-Hao Lan, Taipei (TW); Jyh-Chyang Tzou, Taipei (TW); Ching-Tai Chang, Taipei (TW); Chia-Chi Lin, Taipei (TW); Tsai-Yu Lin, Taipei (TW); Hsin Yeh, Taipei (TW); Che-Hsien Lin, Taipei (TW); Cheng-Shiue Jan, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 15/498,489

(22) Filed: Apr. 27, 2017

(65) Prior Publication Data

US 2017/0344067 A1 Nov. 30, 2017

Related U.S. Application Data

(60) Provisional application No. 62/342,177, filed on May 26, 2016.

(51) Int. Cl.
*G06F 1/16* (2006.01)
*H05K 5/00* (2006.01)
(Continued)

(52) U.S. Cl.
CPC ............ *G06F 1/1633* (2013.01); *E05D 3/18* (2013.01); *E05D 11/082* (2013.01); *F16C 11/04* (2013.01);
(Continued)

(58) Field of Classification Search
CPC .... G06F 1/1633; G06F 1/1616; G06F 1/1618; G06F 1/162; G06F 1/1622; E05D 3/18; E05D 3/183; E05D 11/082; E05D 11/084
(Continued)

(56) References Cited

U.S. PATENT DOCUMENTS 6,880,796 B2 * 4/2005 Khor ...................... F16C 11/10
16/334
8,243,432 B2 * 8/2012 Duan ................... H05K 5/0234
248/188.8
(Continued)

FOREIGN PATENT DOCUMENTS

TW M331055 4/2008
TW M1518458 3/2016
TW M547690 8/2017

OTHER PUBLICATIONS

"Office Action of Taiwan Counterpart Application," dated Oct. 23, 2017, p. 1-p. 6.

*Primary Examiner* — Anthony Haughton
(74) *Attorney, Agent, or Firm* — JCIPRNET

(57) ABSTRACT

A pivot structure includes a base, a bracket, an elastic component, and a positioning assembly. The bracket is rotatably connected to the base. The elastic component is disposed on the base. The positioning assembly includes an elastic clip and a pillar. The elastic clip is pivoted to the base and has a first releasing segment and a first positioning segment. The pillar is connected to the bracket and has a second positioning segment. The pillar is rotatably clipped in the elastic clip. The bracket is adapted to be expanded to (Continued)

a first expanding state through an elastic force of the elastic component, so as to drive the second positioning segment to move along the first releasing segment. The bracket is adapted to receive an external force to be further expanded to a second expanding state, so as to drive the second positioning segment to move to the first positioning segment.

20 Claims, 7 Drawing Sheets

(51) Int. Cl.
  *E05D 3/18* (2006.01)
  *E05D 11/08* (2006.01)
  *F16C 11/04* (2006.01)
  *F16M 13/00* (2006.01)
  *F16C 11/10* (2006.01)
(52) U.S. Cl.
  CPC ...... *F16M 13/005* (2013.01); *E05Y 2900/606* (2013.01); *F16C 11/10* (2013.01)

(58) Field of Classification Search
  USPC .......................... 361/679.21–679.29, 679.55
  See application file for complete search history.

(56) References Cited

U.S. PATENT DOCUMENTS

| 8,307,510 | B2* | 11/2012 | Chuang | G06F 1/1622 |
| | | | | 16/362 |
| 8,369,076 | B2* | 2/2013 | Chuang | H04M 1/0237 |
| | | | | 361/679.26 |
| 8,587,938 | B2* | 11/2013 | Ahn | G06F 1/1624 |
| | | | | 361/679.3 |
| 9,025,327 | B2* | 5/2015 | Noguchi | G06F 1/1632 |
| | | | | 361/679.17 |
| 9,304,549 | B2* | 4/2016 | Siddiqui | E05D 7/00 |
| 9,447,620 | B2* | 9/2016 | Park | E05D 11/10 |
| 9,512,655 | B2* | 12/2016 | Kuo | E05D 1/04 |
| 9,777,524 | B2* | 10/2017 | Shen | E05F 1/1207 |
| 2006/0237623 | A1* | 10/2006 | Sung | F16M 11/10 |
| | | | | 248/688 |
| 2007/0012856 | A1* | 1/2007 | Chan | F16M 11/10 |
| | | | | 248/677 |

* cited by examiner

PIVOT STRUCTURE AND ELECTRONIC DEVICE HAVING THE SAME

CROSS-REFERENCE TO RELATED APPLICATION

This application claims the priority benefit of U.S. provisional application Ser. No. 62/342,177, filed on May 26, 2016. The entirety of the above-mentioned patent application is hereby incorporated by reference herein and made a part of this specification.

BACKGROUND OF THE INVENTION

Field of the Invention

The invention relates to a pivot structure and an electronic device having the pivot structure and more particularly relates to a pivot structure for a stand and an electronic device having the pivot structure.

Description of Related Art

As the electronics industry develops, flat panel displays gradually become the mainstream among displays. In terms of flat panel displays, the liquid crystal display technology is most mature and popular, and can be applied to electronic devices, such as notebook computers, tablet PCs, and smart phones.

A stand can be disposed on the back side of an electronic device for the user to watch the images displayed by the electronic device comfortably. The stand may be expanded to support the electronic device on a table, so as to place the display surface of the electronic device at a proper inclination angle for the user to watch. If an pivot torque between the stand and the electronic device is excessive, it would be difficult for the user to expand the stand closed on the electronic device, making it rather inconvenient to use the stand. On the other hand, if the pivot torque is little, it would be difficult to fix the expanding angle of the stand with respect to the electronic device.

SUMMARY OF THE INVENTION

The invention provides a pivot structure and an electronic device having the pivot structure, which make a stand of the electronic device easy to use and facilitate fixing an expanding angle of the stand.

The pivot structure of the invention includes a base, a bracket, an elastic component, and a positioning assembly. The bracket is rotatably connected to the base. The elastic component is disposed on the base, and the bracket is adapted to be in contact with the elastic component and closed on the base against an elastic force of the elastic component. The positioning assembly includes an elastic clip and a pillar. The elastic clip is pivoted to the base and has a first releasing segment and a first positioning segment. The pillar is connected to the bracket and has a second positioning segment. The pillar is rotatably clipped in the elastic clip. The bracket is adapted to be expanded to a first expanding state with respect to the base through the elastic force of the elastic component, so as to drive the second positioning segment to move along the first releasing segment. The bracket is adapted to receive an external force to be further expanded to a second expanding state with respect to the base, so as to be separated from the elastic component and drive the second positioning segment to move to the first positioning segment.

The electronic device of the invention includes a body, a stand, and a pivot structure. The pivot structure includes a base, a bracket, an elastic component, and a positioning assembly. The bracket is rotatably connected to the base. The elastic component is disposed on the base, and the bracket is adapted to be in contact with the elastic component and closed on the base against an elastic force of the elastic component. The positioning assembly includes an elastic clip and a pillar. The elastic clip is pivoted to the base and has a first releasing segment and a first positioning segment. The pillar is connected to the bracket and has a second positioning segment. The pillar is rotatably clipped in the elastic clip. The bracket is adapted to be expanded to a first expanding state with respect to the base through the elastic force of the elastic component, so as to drive the second positioning segment to move along the first releasing segment. The bracket is adapted to receive an external force to be further expanded to a second expanding state with respect to the base, so as to be separated from the elastic component and drive the second positioning segment to move to the first positioning segment.

In an embodiment of the invention, the elastic clip has an opening. The first releasing segment and the first positioning segment are formed on an inner edge of the opening. The pillar is rotatably clipped in the opening, and an inner diameter of the opening in the first releasing segment is larger than an inner diameter of the opening in the first positioning segment.

In an embodiment of the invention, the pillar has a second releasing segment, and the second releasing segment is aligned with the first positioning segment when the second positioning segment is aligned with the first releasing segment.

In an embodiment of the invention, an outer diameter of the pillar in the second releasing segment is smaller than an outer diameter of the pillar in the second positioning segment.

In an embodiment of the invention, the second releasing segment has at least a flat surface and the second positioning segment has a curved surface.

In an embodiment of the invention, the first releasing segment has a curved surface and the first positioning segment has a flat surface.

In an embodiment of the invention, the base includes at least a curved slot and the bracket includes a frame and at least a slider, and the slider is connected to the frame and disposed slidably in the curved slot.

In an embodiment of the invention, the pivot structure includes a pivoting rod, wherein two ends of the pivoting rod are pivoted to the elastic clip and the base respectively.

In an embodiment of the invention, the bracket is adapted to rotate with respect to the base around a first rotation axis. The two ends of the pivoting rod are pivoted to the elastic clip and the base respectively along a second rotation axis and a third rotation axis. The pillar is rotatably clipped in the elastic clip along a fourth rotation axis. The first rotation axis, the second rotation axis, the third rotation axis, and the fourth rotation axis are parallel to one another.

In an embodiment of the invention, the elastic clip includes a clipping end and a pivoting end opposite to each other, and the clipping end clips the pillar and the pivoting end is pivoted to the pivoting rod.

Based on the above, in the pivot structure of the invention, the elastic clip of the positioning assembly includes the first releasing segment and the first positioning segment. When the bracket is between the closed state and the first expanding state, the second positioning segment of the pillar moves in the first releasing segment of the elastic clip and is not positioned by the first positioning segment of the elastic clip. Consequently, the bracket and the stand connected to the bracket may be automatically expanded to the first expanding state through the elastic force of the elastic component. Thereby, the positioning effect of the positioning assembly would not make it difficult for the user to expand the stand closed on the body of the electronic device, so as to improve the convenience of using the stand of the electronic device. Furthermore, as the bracket is further expanded from the first expanding state to the second expanding state, the second positioning segment of the pillar moves accordingly to the first positioning segment of the elastic clip. Thus, the positioning of the second positioning segment with respect to the first positioning segment fixes the expanding angle of the stand with respect to the body, so as to prevent the stand from being rotated unintentionally with respect to the body.

To make the aforementioned and other features and advantages of the invention more comprehensible, several embodiments accompanied with figures are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
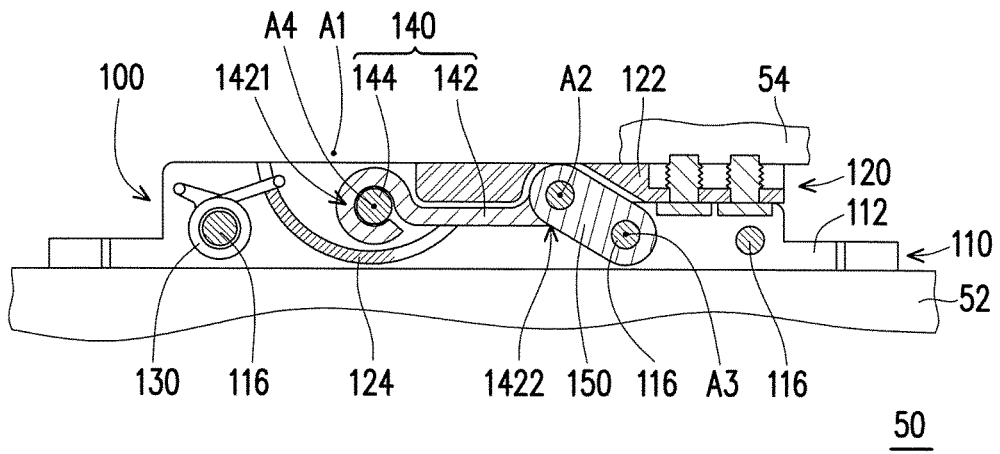
FIG. 1 is a partial cross-sectional view of an electronic device according to an embodiment of the invention.
Figure 2:
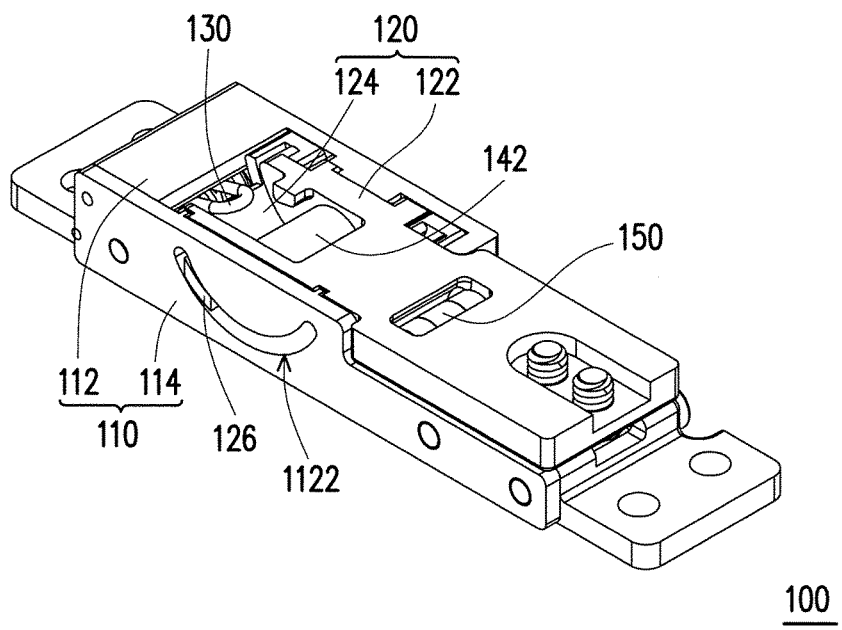
FIG. 2 is a perspective view of a pivot structure of FIG. 1.
Figure 3:
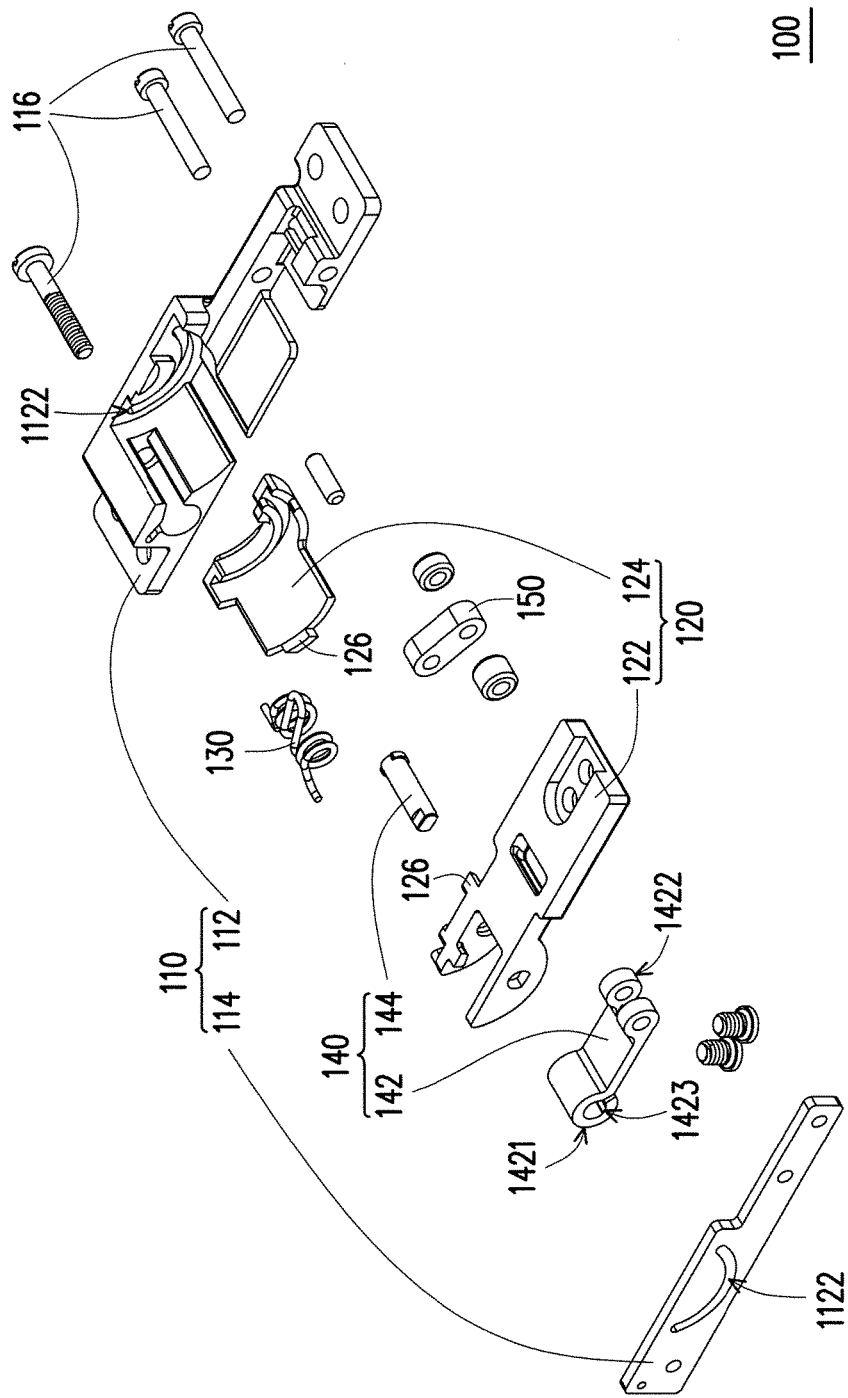
FIG. 3 is an exploded view of the pivot structure of FIG. 1.

FIG. 1 is a partial cross-sectional view of an electronic device according to an embodiment of the invention. FIG. 2 is a perspective view of a pivot structure of FIG. 1. FIG. 3 is an exploded view of the pivot structure of FIG. 1. Referring to FIG. 1 to FIG. 3, an electronic device 50 of this embodiment is a tablet computer, a display of a notebook computer, a smart phone, or electronic devices of other types, for example. The electronic device 50 includes a body 52, a stand 54, and a pivot structure 100. The pivot structure 100 includes a base 110, a bracket 120, an elastic component 130, and a positioning assembly 140. The base 110 is connected to the body 52. The bracket 120 is rotatably connected to the base 110. The stand 54 is connected to the bracket 120.

The elastic component 130 is a torsion spring, for example, and is disposed on the base 110. The bracket 120 is adapted to be in contact with the elastic component 130 and closed on the base 110 against an elastic force of the elastic component 130, as shown in FIG. 1. In this embodiment, the stand 54 is restricted to be closed on the body 52 through a magnetic force of a magnetic component or an engaging force of an engaging structure, such that the bracket 120 is closed on the base 110 against the elastic force of the elastic component 130. The magnetic component and the engaging structure may be disposed on at least one of the body 52 and the stand 54. Nevertheless, the invention is not limited thereto.

Figure 4:
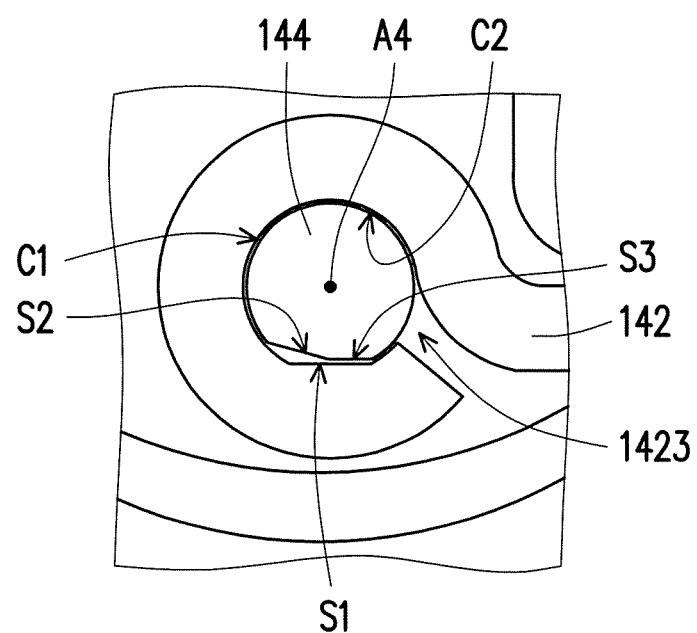
FIG. 4 is a partially enlarged view of a positioning assembly of FIG. 1.
Figure 5A:
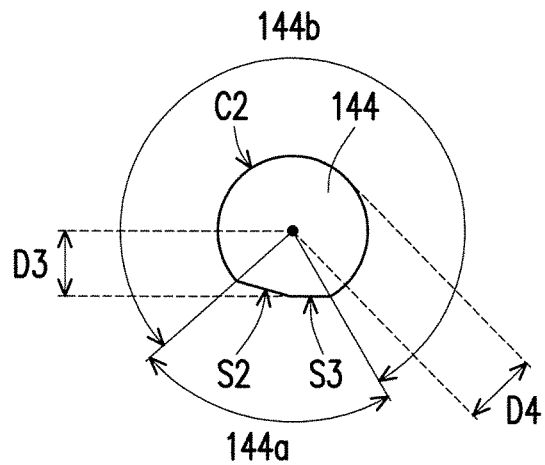
FIG. 5A and FIG. 5B respectively illustrate a pillar and an elastic chip of FIG. 4.
Figure 5B:
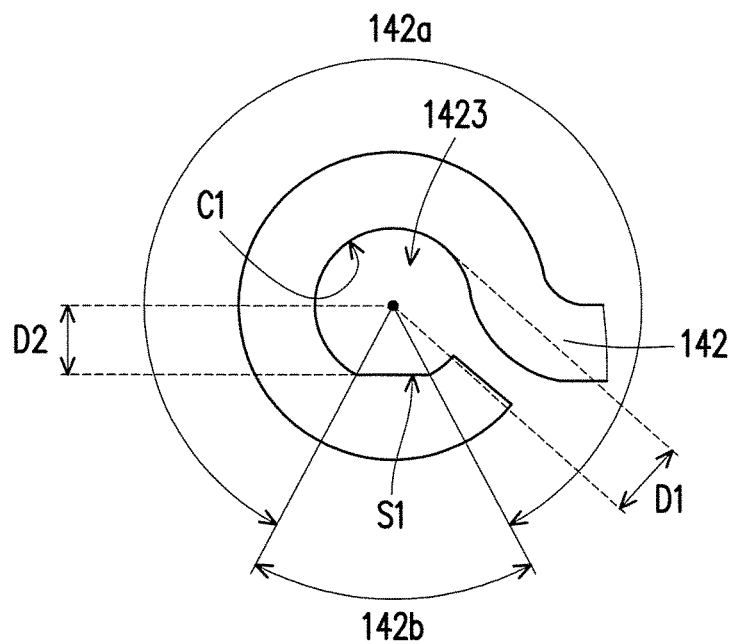

FIG. 4 is a partially enlarged view of the positioning assembly of FIG. 1. FIG. 5A and FIG. 5B respectively illustrate a pillar and an elastic chip of FIG. 4. Referring to FIG. 4 to FIG. 5B, the positioning assembly 140 includes an elastic clip 142 and a pillar 144. The elastic clip 142 is pivoted to the base 110 and has a first releasing segment 142a and a first positioning segment 142b. The pillar 144 is connected to the bracket 120 and has a second releasing segment 144a and a second positioning segment 144b. The pillar 144 is rotatably clipped in the elastic clip 142, and when the second positioning segment 144b is aligned with the first releasing segment 142a, the second releasing segment 144a is aligned with the first positioning segment 142b.

Figure 6A:
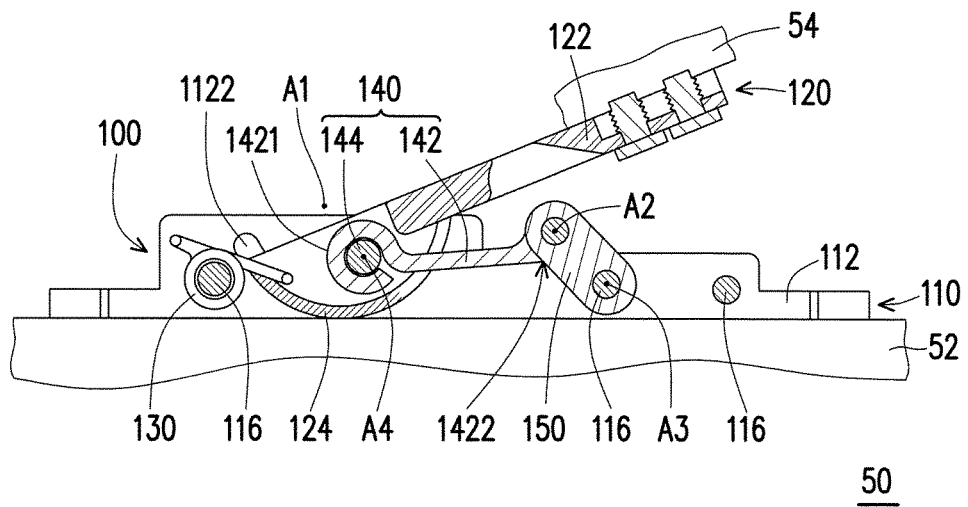
FIG. 6A and FIG. 6B illustrate states where the bracket of FIG. 1 is expanded with respect to the base.
Figure 6B:
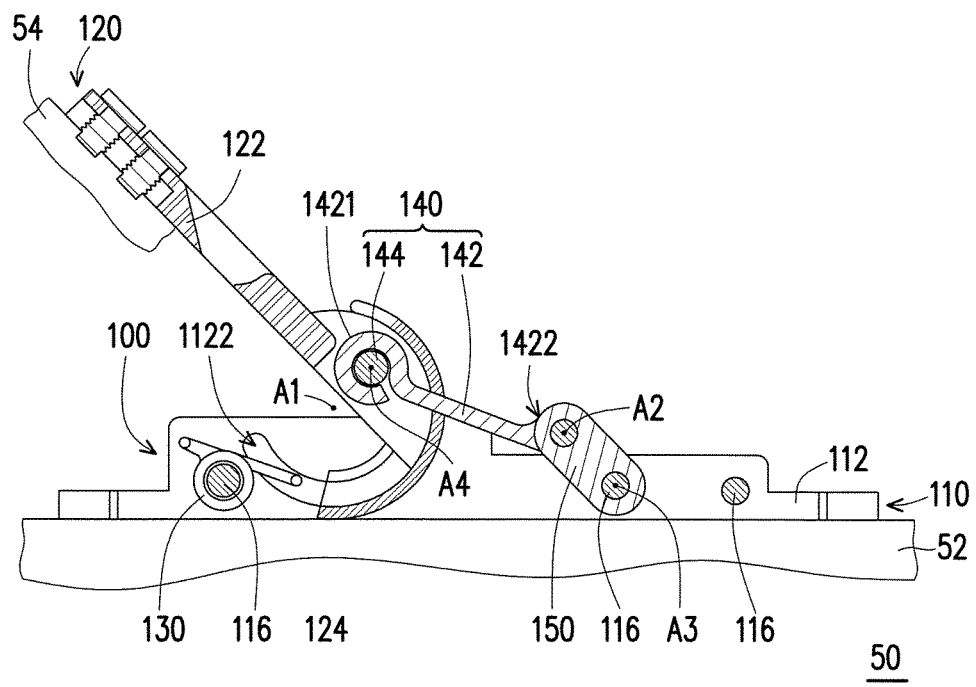
Figure 7A:
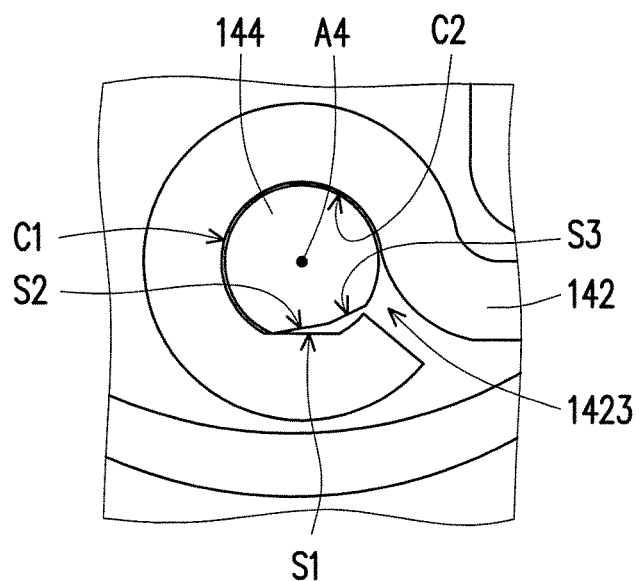
FIG. 7A and FIG. 7B are partially enlarged views of the positioning assembly of FIG. 6A and FIG. 6B respectively.
Figure 7B:
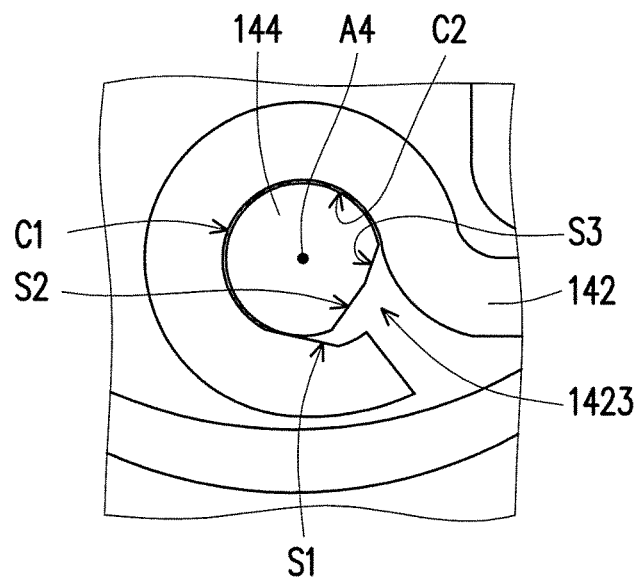

FIG. 6A and FIG. 6B illustrate states where the bracket of FIG. 1 is expanded with respect to the base. FIG. 7A and FIG. 7B are partially enlarged views of the positioning assembly of FIG. 6A and FIG. 6B respectively. Referring to FIG. 6A to FIG. 7B, when the user applies a force on the stand 54 to release the stand 54 and the body 52 from the magnetic force or the engaging force therebetween, the bracket 120 is expanded to a first expanding state with respect to the base 110, as shown in FIG. 6A, through an elastic force of the elastic component 130. In this process, the bracket 120 drives the second positioning segment 144b of the pillar 144 to move along the first releasing segment 142a of the elastic clip 142 and the second releasing segment 144a of the pillar 144 to move along the first positioning segment 142b of the elastic clip 142. In this embodiment, when the pivot structure 100 is in the state shown in FIG. 6A, an expanding angle of the bracket 120 with respect to the base 110 is 30 degrees, for example. Nevertheless, the invention is not limited thereto. Then, the user may continue applying the force on the stand 54, such that the bracket 120 is further expanded with respect to the base 110 to form the angle shown in FIG. 6B and becomes a second expanding state. As a result, the bracket 120 is separated from the elastic component 130 and drives the second positioning segment 144b of the pillar 144 to move to the first positioning segment 142b of the elastic clip 142. In this embodiment, when the pivot structure 100 is in the state shown in FIG. 6B, the expanding angle of the bracket 120 with respect to the base 110 is 150 degrees, for example. Nevertheless, the invention is not limited thereto. It should be noted that, in addition to the expanding angle shown in FIG. 6B, any state between the expanding angle shown in FIG. 6A and the expanding angle shown in FIG. 6B may also be deemed as the second expanding state. The invention is not intended to limit the expanding angle corresponding to the second expanding state.

In the configuration and operation method described above, when the bracket 120 is between the closed state shown in FIG. 1 and the first expanding state shown in FIG. 6A, the second positioning segment 144b of the pillar 144 moves in the first releasing segment 142a of the elastic clip 142 and is not positioned by the first positioning segment 142b of the elastic clip 142. Thus, the bracket 120 and the stand 54 connected to the bracket 120 may be automatically expanded to the first expanding state through the elastic force of the elastic component 130. Accordingly, the positioning effect of the positioning assembly 140 does not make it difficult for the user to expand the stand 54 closed on the body 52 of the electronic device 50, which improves the convenience of using the stand 54 of the electronic device 50. Moreover, when the bracket 120 is further expanded from the first expanding state shown in FIG. 6A to the second expanding state shown in FIG. 6B, the second positioning segment 144b of the pillar 144 moves accordingly to the first positioning segment 142b of the elastic clip 142, such that the second positioning segment 144b and the first positioning segment 142b are pressed and positioned by each other to fix the expanding angle of the stand 54 with respect to the body 52, so as to prevent the stand 54 from being rotated unintentionally with respect to the body 52.

Referring to FIG. 5A, FIG. 5B, FIG. 7A, and FIG. 7B, the elastic clip 142 has an opening 1423. The first releasing segment 142a and the first positioning segment 142b are formed on an inner edge of the opening 1423, and the pillar 144 is rotatably clipped in the opening 1423. An inner diameter D1 of the opening 1423 in the first releasing segment 142a is larger than an inner diameter D2 of the opening 1423 in the first positioning segment 142b. An outer diameter D3 of the pillar 144 in the second releasing segment 144a is smaller than an outer diameter D4 of the pillar 144 in the second positioning segment 144b. The outer diameter D4 of the pillar 144 in the second positioning segment 144b is larger than the inner diameter D2 of the opening 1423 of the elastic clip 142 in the first positioning segment 142b. Accordingly, as shown in FIG. 7B, when the second positioning segment 144b of the pillar 144 is in contact with the first positioning segment 142b of the elastic clip 142, the pillar 144 is rotated to cause the elastic deformation of elastic clip 142, and the pillar 144 is clipped by the elastic force generated by the elastic deformation of the elastic clip 142 to be positioned. Moreover, as shown in FIG. 4 to FIG. 5B, the outer diameter D3 of the second releasing segment 144a is smaller than the inner diameters D1 and D2 of the opening 1423. Thus, the elastic clip 142 is not elastically deformed when the second releasing segment 144a of the pillar 144 is aligned with the first releasing segment 142a and the first positioning segment 142b of the elastic clip 142, and the pillar 144 is not positioned in the elastic clip 142.

In this embodiment, the first releasing segment 142a of the elastic clip 142 has a curved surface C1 and the first positioning segment 142b has a flat surface S1. The curved surface C1 and the flat surface S1 adjacent to each other allow the elastic clip 142 to have a larger inner diameter and a smaller inner diameter respectively in the first releasing segment 142a and the first positioning segment 142b, such that the elastic clip 142 has releasing and positioning effects respectively in the first releasing segment 142a and the first positioning segment 142b. The second releasing segment 144a of the pillar 144 has two flat surfaces S2 and S3 and the second positioning segment 144b has a curved surface C2. The flat surfaces S2 and S3 and the curved surface C2 adjacent to one another allow the pillar 144 to have a smaller outer diameter and a larger outer diameter respectively in the second releasing segment 144a and the second positioning segment 144b, such that the pillar 144 has releasing and positioning effects respectively in the second releasing segment 144a and the second positioning segment 144b. In other embodiments, the first releasing segment 142a, the first positioning segment 142b, the second releasing segment 144a, and the second positioning segment 144b may have structures of other suitable forms. Thus, the invention is not limited to the above.

Details of the pivot structure 100 of this embodiment are further described as follows. Referring to FIG. 1 to FIG. 3, the base 110 of this embodiment includes a main body 112 and an assembly part 114. The assembly part 114 is assembled to the main body 112 through a plurality of fastening components 116. For example, the elastic component 130 is sleeved around one of the fastening components 116, and at least a part of the bracket 120 and at least a part of the positioning assembly 140 are located between the main body 112 and the assembly part 114. In addition, in this embodiment, the pivot structure 100 includes a pivoting rod 150 with two ends respectively pivoted to the elastic clip 142 and the base 110. The elastic clip 142 has a clipping end 1421 and a pivoting end 1422 opposite to each other, wherein the clipping end 1421 clips the pillar 144 while the pivoting end 1422 is pivoted to the pivoting rod 150.

Referring to FIG. 1 to FIG. 3, more specifically, the base 110 of this embodiment has two curved slots 1122 disposed on the main body 112 and the assembly part 114 to be opposite to each other. The bracket 120 includes a frame 122 and a slider 124 connected to the frame 122. Both the frame 122 and the slider 124 have a sliding block 126 respectively and the two sliding blocks 126 are slidably disposed in the corresponding two curved slots 1122. Thereby, the bracket 120 may rotate with respect to the base 110 around a first rotation axis A1 as the sliding blocks 126 slide along the corresponding curved slots 1122, wherein the first rotation axis A1 passes through a curvature center of each curved slot 1122, for example. Moreover, the two ends of the pivoting rod 150 are respectively pivoted to the pivoting end 1422 of the elastic clip 142 and the base 110 along a second rotation axis A2 and a third rotation axis A3. The pillar 144 is rotatably clipped in the elastic clip 142 along a fourth rotation axis A4. In this embodiment, the first rotation axis A1, the second rotation axis A2, the third rotation axis A3, and the fourth rotation axis A4 are parallel to one another.

Figure 8:
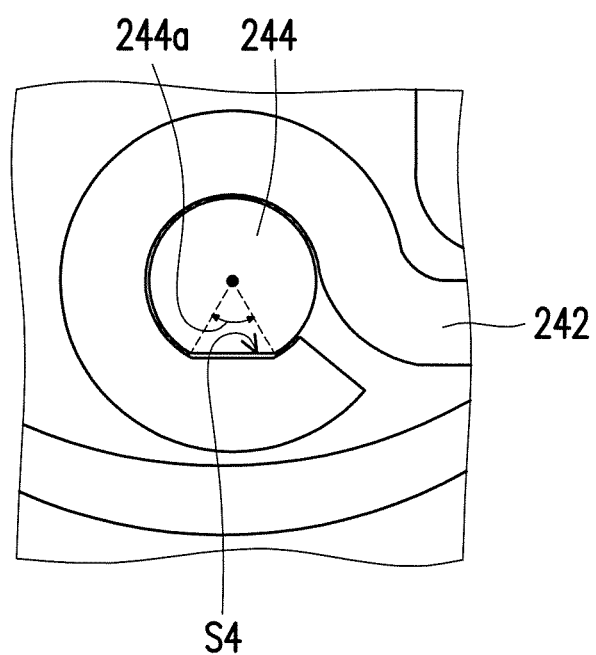
FIG. 8 is a partially enlarged view of a positioning assembly according to another embodiment of the invention.

FIG. 8 is a partially enlarged view of a positioning assembly according to another embodiment of the invention. An elastic clip 242 and a pillar 244 of FIG. 8 have configurations and functions similar to those of the elastic clip 142 and the pillar 144 of FIG. 4. Thus, details thereof are not repeated hereinafter. A difference between the embodiment of FIG. 8 and the embodiment of FIG. 4 is that: a second releasing segment 244a of the pillar 244 has a flat surface S4 only, unlike the pillar 144 which has the two flat surfaces S2 and S3.

To conclude, in the pivot structure of the invention, the elastic clip of the positioning assembly has the first releasing segment and the first positioning segment while the pillar has the second releasing segment and the second positioning segment. When the bracket is between the closed state and the first expanding state, the second releasing segment of the pillar moves in the first positioning segment of the elastic clip and the second positioning segment of the pillar moves in the first releasing segment of the elastic clip. Thus, the second positioning segment of the pillar is not positioned in the first positioning segment of the elastic clip. Consequently, the bracket and the stand connected to the bracket may be automatically expanded to the first expanding state through the elastic force of the elastic component. Thereby, the positioning effect of the positioning assembly would not make it difficult for the user to expand the stand closed on the body of the electronic device, so as to improve use of the stand of the electronic device. Furthermore, as the bracket is further expanded from the first expanding state to the second expanding state, the second positioning segment of the pillar moves accordingly to the first positioning segment of the elastic clip. Thus, the positioning of the second positioning segment with respect to the first positioning segment fixes the expanding angle of the stand with respect to the body, so as to prevent the stand from being rotated unintentionally with respect to the body.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A pivot structure, comprising:
   a base;
   a bracket rotatably connected to the base;
   an elastic component disposed on the base, wherein the bracket is adapted to be in contact with the elastic component and closed on the base against an elastic force of the elastic component; and
   a positioning assembly comprising an elastic clip and a pillar, wherein the elastic clip is pivoted to the base and has a first releasing segment and a first positioning segment, and the pillar is connected to the bracket and has a second positioning segment, and the pillar is rotatably clipped in the elastic clip,
   wherein the bracket is adapted to be expanded to a first expanding state with respect to the base through the elastic force of the elastic component to drive the second positioning segment to move along the first releasing segment, and the bracket is adapted to receive an external force to be further expanded to a second expanding state with respect to the base, so as to be separated from the elastic component and drive the second positioning segment to move to the first positioning segment.

2. The pivot structure according to claim 1, wherein the elastic clip has an opening, the first releasing segment and the first positioning segment are formed on an inner edge of the opening, the pillar is rotatably clipped in the opening, and an inner diameter of the opening in the first releasing segment is larger than an inner diameter of the opening in the first positioning segment.

3. The pivot structure according to claim 1, wherein the pillar has a second releasing segment, and the second releasing segment is aligned with the first positioning segment when the second positioning segment is aligned with the first releasing segment.

4. The pivot structure according to claim 3, wherein an outer diameter of the pillar in the second releasing segment is smaller than an outer diameter of the pillar in the second positioning segment.

5. The pivot structure according to claim 3, wherein the second releasing segment has at least a flat surface and the second positioning segment has a curved surface.

6. The pivot structure according to claim 1, wherein the first releasing segment has a curved surface and the first positioning segment has a flat surface.

7. The pivot structure according to claim 1, wherein the base comprises at least a curved slot and the bracket comprises a frame and at least a slider, and the slider is connected to the frame and disposed slidably in the curved slot.

8. The pivot structure according to claim 1, comprising a pivoting rod, wherein two ends of the pivoting rod are pivoted to the elastic clip and the base respectively.

9. The pivot structure according to claim 8, wherein the bracket is adapted to rotate with respect to the base around a first rotation axis, the two ends of the pivoting rod are pivoted to the elastic clip and the base respectively along a second rotation axis and a third rotation axis, and the pillar is rotatably clipped in the elastic clip along a fourth rotation axis, wherein the first rotation axis, the second rotation axis, the third rotation axis, and the fourth rotation axis are parallel to one another.

10. The pivot structure according to claim 8, wherein the elastic clip comprises a clipping end and a pivoting end opposite to each other, and the clipping end clips the pillar and the pivoting end is pivoted to the pivoting rod.

11. An electronic device, comprising:
    a body and a stand; and
    a pivot structure, comprising:
       a base;
       a bracket rotatably connected to the base;
       an elastic component disposed on the base, wherein the bracket is adapted to be in contact with the elastic component and closed on the base against an elastic force of the elastic component; and
       a positioning assembly comprising an elastic clip and a pillar, wherein the elastic clip is pivoted to the base and has a first releasing segment and a first positioning segment, and the pillar is connected to the bracket and has a second positioning segment, and the pillar is rotatably clipped in the elastic clip,
       wherein the bracket is adapted to be expanded to a first expanding state with respect to the base through the elastic force of the elastic component to drive the second positioning segment to move along the first releasing segment, and the bracket is adapted to receive an external force to be further expanded to a second expanding state with respect to the base, so as to be separated from the elastic component and drive the second positioning segment to move to the first positioning segment.

12. The electronic device according to claim 11, wherein the elastic clip has an opening, the first releasing segment and the first positioning segment are formed on an inner edge of the opening, the pillar is rotatably clipped in the opening, and an inner diameter of the opening in the first releasing segment is larger than an inner diameter of the opening in the first positioning segment.

13. The electronic device according to claim 11, wherein the pillar has a second releasing segment, and the second releasing segment is aligned with the first positioning segment when the second positioning segment is aligned with the first releasing segment.

14. The electronic device according to claim 13, wherein an outer diameter of the pillar in the second releasing segment is smaller than an outer diameter of the pillar in the second positioning segment.

15. The electronic device according to claim 13, wherein the second releasing segment has at least a flat surface and the second positioning segment has a curved surface.

16. The electronic device according to claim 11, wherein the first releasing segment has a curved surface and the first positioning segment has a flat surface.

17. The electronic device according to claim 11, wherein the base comprises at least a curved slot and the bracket comprises a frame and at least a slider, and the slider is connected to the frame and disposed slidably in the curved slot.

18. The electronic device according to claim 11, wherein the pivot structure comprises a pivoting rod, and two ends of the pivoting rod are pivoted to the elastic clip and the base respectively.

19. The electronic device according to claim 18, wherein the bracket is adapted to rotate with respect to the base around a first rotation axis, the two ends of the pivoting rod are pivoted to the elastic clip and the base respectively along a second rotation axis and a third rotation axis, and the pillar is rotatably clipped in the elastic clip along a fourth rotation axis, wherein the first rotation axis, the second rotation axis, the third rotation axis, and the fourth rotation axis are parallel to one another.

20. The electronic device according to claim 18, wherein the elastic clip comprises a clipping end and a pivoting end opposite to each other, and the clipping end clips the pillar and the pivoting end is pivoted to the pivoting rod.

\* \* \* \* \*